United States Patent
Piccinini et al.

(10) Patent No.: US 8,601,061 B2
(45) Date of Patent: Dec. 3, 2013

(54) SCHEDULING A MEETING IN REAL TIME

(75) Inventors: Sandro Piccinini, Rome (IT); Luigi Pichetti, Rome (IT); Marco Secchi, Rome (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 13/184,265

(22) Filed: Jul. 15, 2011

(65) Prior Publication Data

US 2013/0018951 A1    Jan. 17, 2013

(51) Int. Cl.
*G06F 13/00* (2006.01)

(52) U.S. Cl.
USPC .............................. 709/205; 709/206; 709/228

(58) Field of Classification Search
USPC .......... 709/204, 205, 223, 224, 227, 228, 206
See application file for complete search history.

(56) References Cited

U.S. PATENT DOCUMENTS

| | | | |
|---|---|---|---|
| 6,484,033 B2 | 11/2002 | Murray | |
| 6,687,608 B2 | 2/2004 | Sugimoto et al. | |
| 7,847,684 B1 | 12/2010 | Brady, Jr. | |
| 7,941,133 B2 * | 5/2011 | Aaron et al. | 455/418 |
| 2002/0184063 A1 | 12/2002 | Kaufman et al. | |
| 2003/0217073 A1 | 11/2003 | Walther et al. | |
| 2009/0017803 A1 | 1/2009 | Brillhart et al. | |
| 2009/0100037 A1 | 4/2009 | Scheibe | |
| 2009/0203317 A1 * | 8/2009 | Waung | 455/41.2 |
| 2011/0004501 A1 * | 1/2011 | Pradhan et al. | 705/8 |
| 2011/0070872 A1 * | 3/2011 | Ellanti et al. | 455/414.2 |

FOREIGN PATENT DOCUMENTS

DE    102004018681 A1    11/2005

* cited by examiner

*Primary Examiner* — Viet Vu

(74) *Attorney, Agent, or Firm* — Yee & Associates, P.C.; David A. Mims, Jr.

(57) ABSTRACT

A method, data processing system, and computer program product for sending a notification of a meeting. An identification is made when a number of users in a plurality of users requesting the notification of the meeting is within a threshold distance. Whether the number of users is greater than or equal to a threshold number of the plurality of users needed to have the meeting is determined in response to the identification that the number of users in the plurality of users is within the threshold distance. The notification of the meeting is sent to the number of the users in response to determining that the number of users is greater than or equal to the threshold number.

19 Claims, 9 Drawing Sheets

400

GROUP PROFILE

| NAME 402 | DEVICE IDENTIFIERS 404 | ADMINISTRATORS 406 |
|---|---|---|
| JOE | 123.234.1.1 | NO |
| BILL | 888-123-4567 | NO |
| SUE | SUE@COMPANY.COM | YES |

| GROUP TOPICS 408 | GROUP LOCATIONS 410 | RANGE OF TIMES 412 |
|---|---|---|
| BUSINESS | CAFE, ANY | M-F 8AM-5PM |
| SPORTS | PARK | M-F 6PM-9PM<br>SAT 8AM-9PM |
| LUNCH | RESTAURANT | 10AM-2PM |

| DISTANCE THRESHOLD | 1 mi | ~416 |

418 — PRIVATE GROUP [X]

| PASSWORD |
| XXXXXXXX |

| MEMBER THRESHOLD | 2 | ~414 | 420 |

FIG. 4

SCHEDULING A MEETING IN REAL TIME

BACKGROUND

1. Field

The disclosure relates generally to meeting scheduling systems and more specifically to scheduling systems. Still more particularly, the present disclosure relates to systems and methods for scheduling a meeting in real time.

2. Description of the Related Art

When an organizer desires to schedule a meeting, the organizer can send invitations to the meeting to a list of invitees. Typically meetings are scheduled in advance with invitations being sent before the meeting is scheduled to occur. The organizer can specify a time and location for the meeting.

The success of a meeting can depend on the number of invitees that attend the meeting. The organizer can choose a time and location designed to allow a large percentage of the invitees attending the meeting. Additionally, the organizer may send the invitations a certain amount of time before the meeting is scheduled to occur. The time allows the invitees to review their schedule to determine whether they can attend the meeting.

However, the organizer may not be able to select a time and location that allows all the invitees to attend the meeting. For example, the organizer may not know of a location that is convenient for the invitees to travel to for the meeting. In another example, the organizer may wish to schedule a meeting soon. There may not be enough time for the invitees to receive the invitations, review their schedule, and find the time to attend the meeting.

Accordingly, it would be advantageous to have a method and apparatus, which takes into account one or more of the issues discussed above as well as possibly other issues.

SUMMARY

The different illustrative embodiments provide a method, data processing system, and computer program product for sending a notification of a meeting. An identification is made when a number of users in a plurality of users requesting the notification of the meeting is within a threshold distance. Whether the number of users is greater than or equal to a threshold number of the plurality of users needed to have the meeting is determined in response to the identification that the number of users in the plurality of users is within the threshold distance. The notification of the meeting is sent to the number of the users in response to determining that the number of users is greater than or equal to the threshold number.

BRIEF DESCRIPTION OF THE SEVERAL VIEWS OF THE DRAWINGS

FIG. 4 is an illustration of a group profile for a meeting system in accordance with an illustrative embodiment;

DETAILED DESCRIPTION

Figure 1:
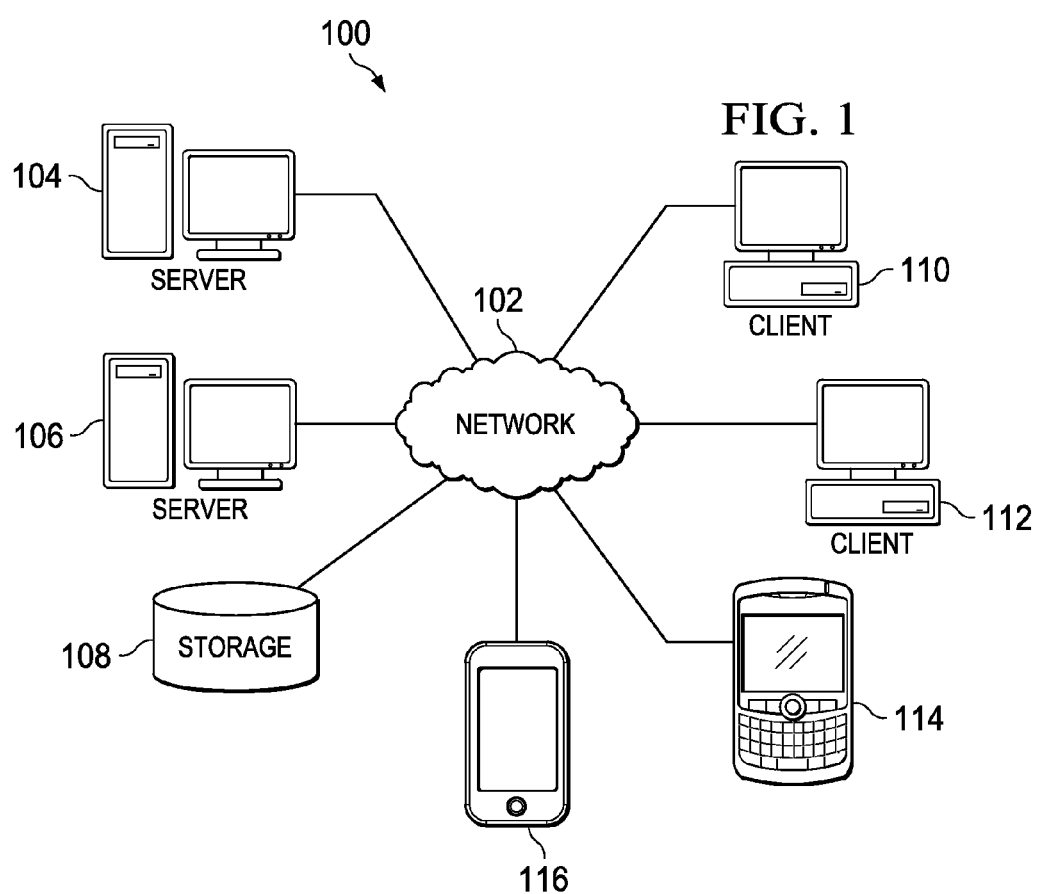
FIG. 1 is a pictorial representation of a network of data processing systems in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110, 112, 114, and 116 connect to network 102. Client devices 110, 112, 114, and 116 may be, for example, without limitation, personal computers, network computers, laptop computers, netbooks, tablet computers, electronic reading devices, personal digital assistants, personal electronic devices, mobile phones, pagers, and/or any other communication device. In the depicted example, server computer 104 provides information, such as boot files, operating system images, and applications to client devices 110, 112, 114, and 116. Client devices 110, 112, 114, and 116 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol suite of protocols to communicate with one another. At the heart of the Internet is a backbone of high-speed data communication lines between major nodes or host computers consisting of thousands of commercial, governmental, educational and other computer systems that route data and messages.

In these illustrative examples, client devices 110, 112, 114, and 116 can be used to send and receive notifications of meetings. For example, a meeting organizer may send a notification using client device 110. Server computer 104 can receive the notification and forward the notification to client devices 114 and 116. Additionally, client devices 110, 112, 114, and 116 can be used to set up and modify meeting profile information and settings. The meeting profile information and settings may be stored in storage unit 108. Server 104 may monitor a location of client devices 110, 112, 114, and 116. Server 104 can send notifications to at least one of client devices 110, 112, 114, and 116 based on the location and the meeting profile settings.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The different illustrative embodiments recognize and take into account a number of different considerations. For example, the different illustrative embodiments recognize it may be desirable to schedule a meeting in real time. Real time is the act of processing information for an event at or at about the same time the event is occurring. Real time of information may occur when information is processed as fast as possible without any intentional delays. Thus, scheduling a meeting in real time is scheduling the meeting at about the same time the meeting is occurring.

The different illustrative embodiments recognize and take into account that that one solution may involve an organizer of a meeting sending a notification of a meeting to invitees just before a meeting is scheduled to start. However, the different illustrative embodiments recognize that invitees may not be able to attend a meeting that is scheduled just before the meeting is scheduled to start. For example, the invitees may need time to review and/or modify their schedule to determine whether they are available to attend the meeting. Further, the invitees may need time to travel to the location where the meeting is being held.

The different illustrative embodiments also recognize that it may be desirable to schedule a meeting when invitees of the meeting are near a location for a meeting. If a certain number of invitees are near a location for the meeting, the invitees may be more likely to be able to attend the meeting. Additionally, the amount of time that the invitees would need to travel to the meeting location may be less than if the invitees were further away from the location.

The different illustrative embodiments recognize and take into account that one solution may involve an organizer scheduling a meeting at a location that is available to host a meeting. However, the different illustrative embodiments recognize that the organizer may not take into account the locations of the invitees when scheduling the meeting. Further, the organizer may not be able to predict a time where a large percentage of the attendees are near a location that is available to host a meeting.

Thus, the different illustrative embodiments provide a method, data processing system, and computer program product for sending a notification of a meeting. An identification is made when a number of users in a plurality of users requesting the notification of the meeting is within a threshold distance. Whether the number of users is greater than or equal to a threshold number of the plurality of users needed to have the meeting is determined in response to the identification that the number of users in the plurality of users is within the threshold distance. The notification of the meeting is sent to the number of the users in response to determining that the number of users is greater than or equal to the threshold number. A "number", as used herein with reference to an item, means one or more items.

Figure 2:
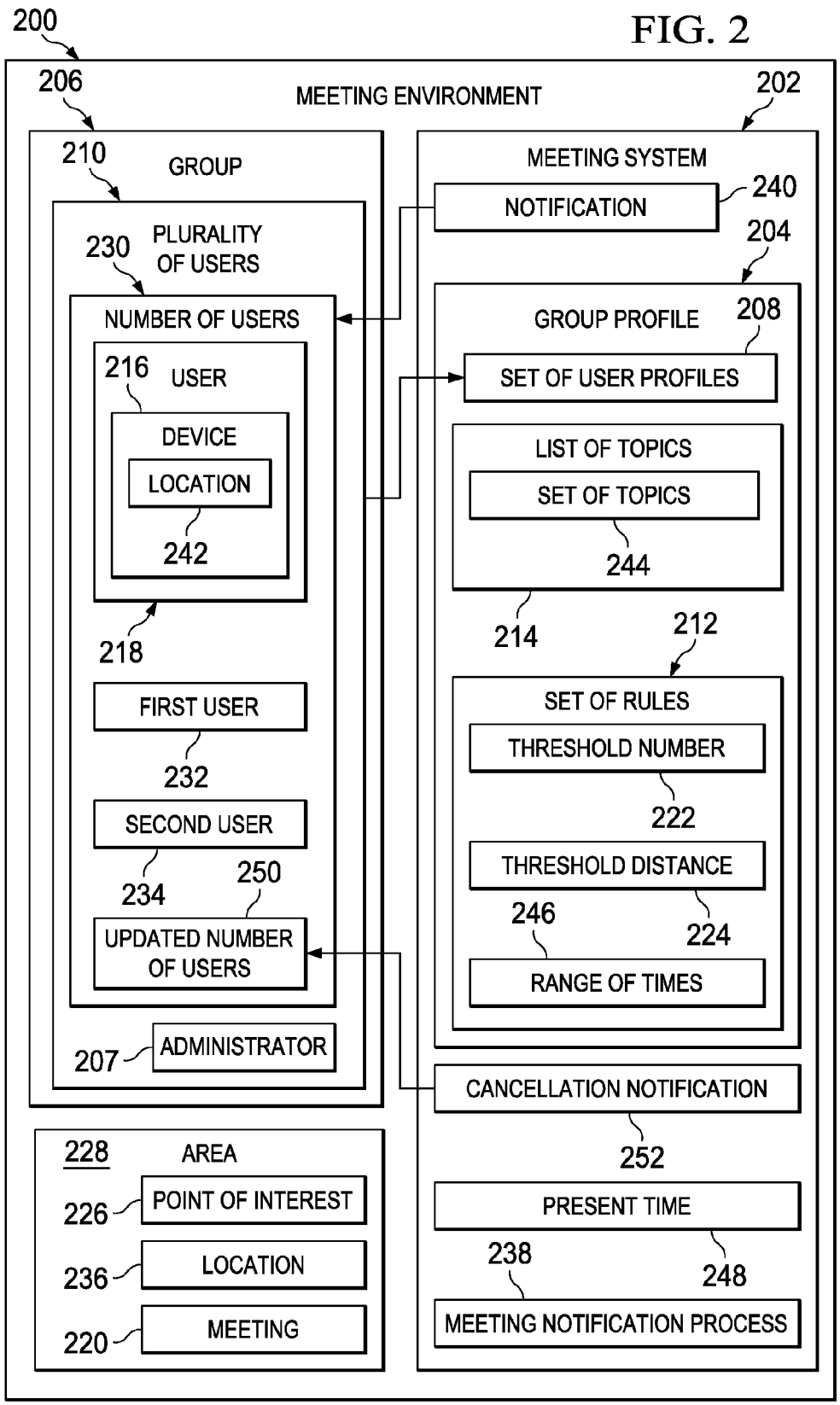
FIG. 2 is a block diagram of meeting environment in accordance with an illustrative embodiment.

With reference now to FIG. 2, a block diagram of meeting environment is depicted in accordance with an illustrative embodiment. In these illustrative examples, meeting environment 200 is an environment where meetings are scheduled and held. For example, network data processing system 100 in FIG. 1 may be implemented within meeting environment 200 to schedule meetings.

In this illustrative example, meeting system 202 schedules meetings within meeting environment 200. Meeting system 202 is hardware and/or software for scheduling meetings. For example, meeting system 202 may be one embodiment of server 104 in FIG. 1.

In these illustrative examples, meeting system 202 maintains group profile 204 for group 206. Group profile 204 is information that is used to schedule meetings for group 206. Group profile 204 can be generated by administrator 207 for group 206. Group profile 204 includes set of rules 212 for scheduling meetings for plurality of users 210 in group 206. A "set", as used herein with reference to an item, means one or more items. Group profile 204 further includes list of topics 214 for meetings of group 206.

Meeting system 202 also maintains set of user profiles 208 for plurality of users 210 in group 206. For example, meeting system 202 stores and updates set of user profiles 208 for plurality of users 210. Set of user profiles 208 is information about plurality of users 210. For example, set of user profiles 208 includes information for identifying device 216 of user 218 in group 206. In these examples, device 216 can be used by user 218 to send and receive information from meeting system 202. For example, without limitation, client devices 110, 112, 114, and 116 in FIG. 1 are examples of different implementations of device 216. In one example, user 218 may use device 216 to set up and/or modify information within set of user profiles 208. Each user in plurality of users 210 may have a separate profile in set of user profiles 208.

Set of user profiles 208 may also include information about which topics in list of topics 214 user 218 is interested in attending. For example, user 218 may subscribe to certain topics in list of topics 214. List of topics 214 is one or more subjects for meetings of group 206. For example, without limitation, list of topics 214 may include topics regarding business discussion subjects, personal discussion subjects, activities, and/or any other types of subjects for meetings of group 206. The activities may be, for example, without limitation, meals, sports, exercising, and entertainment. In these examples, administrator 207 may generate list of topics 214 for group 206. Other users in plurality of users 210 may also generate and/or add to list of topics 214.

In these illustrative examples, meeting system 202 uses set of rules 212 to determine when to schedule meeting 220 in meeting environment 200. Set of rules 212 includes at least two rules for determining when to schedule meeting 220. First, set of rules 212 includes threshold number 222 of users in plurality of users 210 that are needed to hold meeting 220. For example, meeting 220 may not happen if no one can attend meeting 220. In other examples, a certain number of users in group 206 may need to be present to conduct business or participate in a sporting activity.

Second, set of rules 212 includes threshold distance 224. Threshold distance 224 is a geographical distance where meeting system 202 considers user 218 to be available for meeting 220. In one example, meeting 220 occurs at point of interest 226. Point of interest 226 is a fixed geographical location where meeting 220 is held. In this example, threshold distance 224 defines a range surrounding area 228 where point of interest 226 is located. Thus, if user 218 is in area 228, meeting system 202 considers user 218 to be available for meeting 220.

In another example, meeting system 202 considers number of users 230 available for meeting 220 when number of users 230 are within threshold distance 224 from each other. For example, if first user 232 is threshold distance 224 from second user 234, meeting system 202 considers first user 232 and second user 234 to be available to meet for meeting 220. In this example, area 228 is where first user 232 and second user 234 are located. Meeting system 202 selects location 236 for meeting 220 in area 228.

In these illustrative examples, meeting notification process 238 monitors plurality of users 210 to determine when to schedule meeting 220. Meeting notification process 238 can schedule meeting 220 by sending notification 240 of meeting 220. Meeting notification process 238 determines when to schedule meeting 220 by identifying number of users 230 in group 206 that are available to attend meeting 220. Meeting notification process 238 determines whether users in group 206 are available by monitoring locations of one or more users in group 206. For example, meeting notification process 238 identifies location 242 of device 216 of user 218.

In these illustrative examples, meeting notification process 238 can identify location 242 in a number of manners. For example, without limitation, meeting notification process 238 may use global positioning system (GPS) location information from satellites receiving data from device 216, a location of one or more communication towers receiving data from device 216, and/or an internet protocol address included in data sent from device 216.

In a first example for determining whether users in group 206 are available, meeting notification process 238 identifies the distance between location 242 and point of interest 226. If the distance between location 242 and point of interest 226 is less than or equal to threshold distance 224, meeting notification process 238 considers user 218 available to attend meeting 220. In a second example, meeting notification process 238 identifies the distance between first user 232 and second user 234. If the distance between first user 232 and second user 234 is less than or equal to threshold distance 224, meeting notification process 238 considers first user 232 and second user 234 available to attend meeting 220.

In either example, meeting notification process 238 considers each user in group 206 within threshold distance 224 in number of users 230 that are available to attend meeting 220. Meeting notification process 238 then compares number of users 230 to threshold number 222 of users needed for meeting 220 to occur. If the number of users in number of users 230 is less than or equal to threshold number 222, meeting notification process 238 may schedule meeting 220.

In scheduling meeting 220, meeting notification process 238 may also identify set of topics 244 for meeting 220. In one example, meeting notification process 238 searches set of user profiles 208 to determine which topics in list of topics 214 each user in number of users 230 has subscribed. In this depicted example, meeting notification process 238 selects the topics each user in number of users 230 subscribed to as set of topics 244 for meeting 220. In another example, meeting notification process 238 searches group profile 204 for topics in list of topics 214 that are specific to point of interest 226. For example, point of interest 226 may be a park or a restaurant. In this example, topics such as "play sports" may be specific to the park, while a topic of "have a meal" may be specific to the restaurant.

In these illustrative examples, meeting notification process 238 may also consider range of times 246 for set of topics 244 in scheduling meeting 220. Range of times 246 are times when one or more topics in list of topics 214 are appropriate. Each topic in list of topics 214 may include range of times 246 when holding meeting 220 with the topic is permitted. For example, group profile 204 may be set up to have meeting notification process 238 schedule meetings with the topic of having breakfast during morning hours. In another illustrative example, group profile 204 may be set up to have meetings with a topic of discussing business on scheduled weekdays during business hours.

Meeting notification process 238 compares present time 248 with range of times 246 that list of topics 214 are permitted. If present time 248 is not within range of times 246 for a topic from list of topics 214, meeting notification process 238 may determine not to include the topic in set of topics 244 for meeting.

In scheduling meeting 220, meeting notification process 238 identifies location 236 for meeting 220. As discussed above, meeting notification process 238 may identify number of users 230 within threshold distance 224 of point of interest 226. In this example, meeting notification process 238 identifies point of interest 226 as location 236 for meeting 220.

Also as discussed above, meeting notification process 238 may identify number of users 230 within threshold distance 224 of each other. In this example, meeting notification process 238 selects location 236 for meeting 220. In this example, meeting notification process 238 searches area 228 between users in number of users 230 for location 236. For example, meeting notification process 238 may search a map of area 228 for locations that meeting 220 can be held. For example, meeting notification process 238 may consider the number of users in number of users 230 available for meeting 220 and/or set of topics 244 for meeting 220 to identify location 236 that is appropriate for meeting 220 to be held.

In these illustrative examples, meeting notification process 238 schedules meeting 220 by sending notification 240 to number of users 230. Notification 240 is a message sent to number of users 230 notifying number of users 230 of meeting 220. For example, notification 240 may be sent to and received by device 216. For example, without limitation, notification 240 may include an invitation for number of users 230 to join meeting 220, a time for meeting 220, location 236 where meeting 220 is scheduled to be held, and/or set of topics 244 for meeting 220.

After receiving notification 240, users in number of users 230 may respond with whether they will attend meeting 220. For example, user 218 may decline or accept the invitation to meeting 220. Additionally, user 218 may decline or accept to attend individual topics in set of topics for to meeting 220. After receiving responses from number of users 230, meeting notification process 238 may recalculate the number of users in group 206 that is available to attend meeting 220. For example, meeting notification process 238 identifies updated number of users 250 that is still available to attend meeting 220. If updated number of users 250 is below threshold number 222, meeting notification process 238 sends cancellation notification 252 to updated number of users 250.

In some embodiments, user 218 may confirm meeting 220 before meeting notification process 238 sends notification 240. In one example, user 218 may be an organizer of meeting 220. User 218 has confirmed that user 218 will attend meeting 220 before notification 240 is sent. Notification 240 may include an indication that user 218 is an organizer and/or has confirmed attendance. In another example, user 218 may specify in a profile in set of profiles 208 that user 218 will always attend certain types of meetings when user 218 is considered available by meeting system 202. In this example, notification 240 may include an indication that user 218 is attending meeting 220.

Meeting notification process 238 may also reconsider set of topics 244 for meeting 220. For example, meeting notification process 238 identifies which topics in set of topics 244 will be attended by updated number of users 250. If topics in set of topics 244 will not be attended by updated number of users 250, meeting notification process 238 removes those topics from set of topics 244 for meeting 220. Meeting notification process 238 may also include information in cancellation notification 252 that those topics were removed from set of topics 244 for meeting 220.

The different illustrative embodiments schedule meeting 220 based on locations of users in group 206. Meeting notification process 238 determines the availability of users in group 206 based on their location. Meeting 220 can be scheduled and notification 240 of meeting 220 can be sent to number of users 230 without user input. Further, location 236 for meeting 220 can be selected without user input. For example, location 236 for meeting 220 may be selected dynamically based on user location. The different illustrative embodiments can schedule meeting 220 and select location 236 of meeting 220 after users have unknowingly been heading toward location 236 of meeting 220.

In this manner, the different illustrative embodiments schedule meetings in real time during and even in some cases after the attendees of the meeting are traveling to the meeting location. The different illustrative embodiments schedule meetings without user input during scheduling. Establishment of group profile 204 and set of user profiles 208 allow for meeting times and locations to be convenient for users to attend. Increased user convenience may improve meeting attendance and result in efficient scheduling of meetings.

The illustration of meeting environment 200 in FIG. 2 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, meeting notification process 238 may only consider threshold number 222 and threshold distance 224 in determining whether to schedule meeting 220. In other illustrative embodiments, meeting notification process 238 may consider at least one of threshold number 222, threshold distance 224, range of times 246, and list of topics 214 in determining whether to schedule meeting 220. In some other illustrative embodiments, administrator 207 may establish multiple different group profiles for different groups of users and with different lists of topics.

In yet other illustrative embodiments, meeting notification process 238 may only schedule meetings when number of users 230 is within threshold distance 224 of point of interest 226. In still other illustrative embodiments, meeting notification process 238 may only schedule meetings when number of users 230 is within threshold distance 224 of each other. In some illustrative embodiments, meeting notification process 238 may schedule meetings when either number of users 230 is within threshold distance 224 of point of interest 226 or number of users 230 is within threshold distance 224 of each other.

Figure 3:
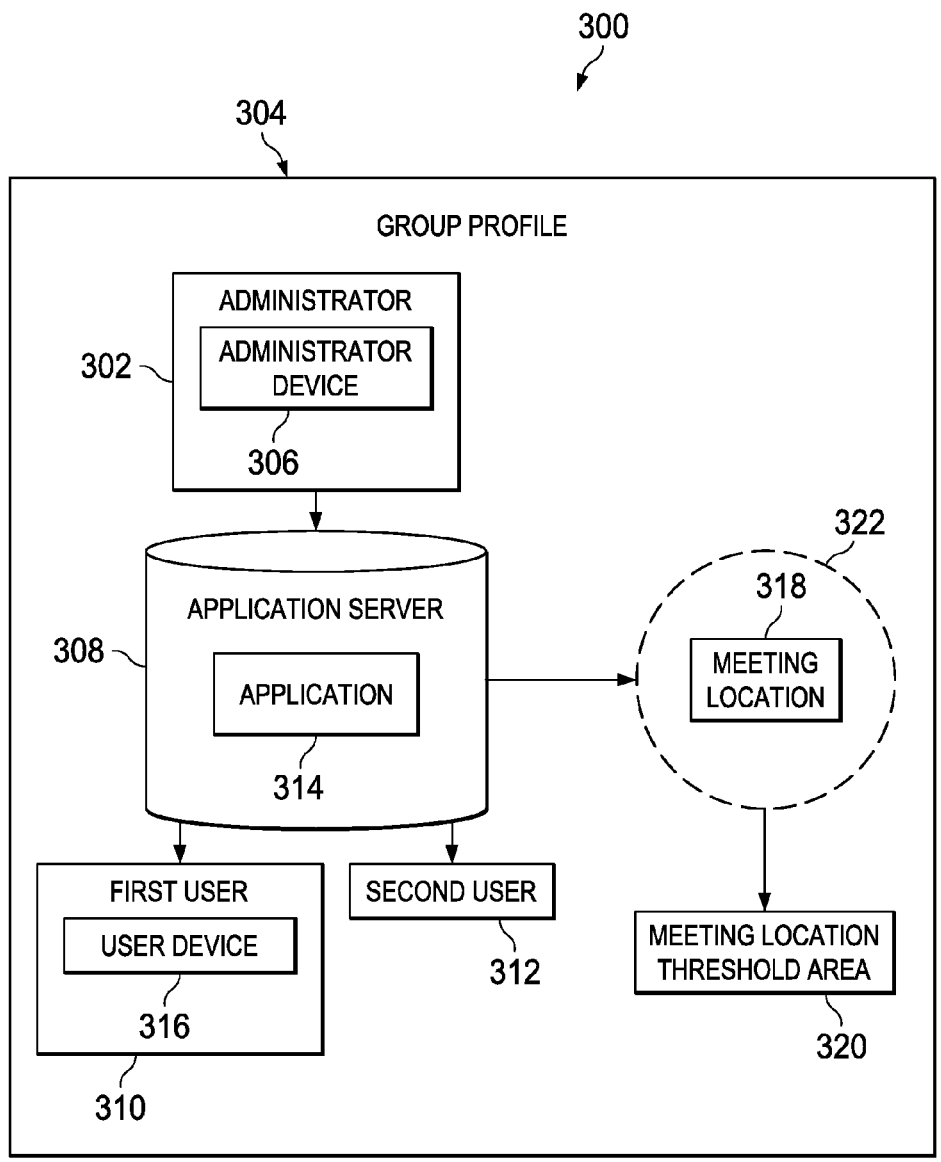
FIG. 3 is an illustration of a meeting arrangement environment in accordance with an illustrative embodiment.

With reference now to FIG. 3, an illustration of a meeting arrangement environment is depicted in accordance with an illustrative embodiment. In this illustrative example, meeting arrangement environment 300 is an example of one embodiment of meeting environment 200 in FIG. 2.

In this illustrative example, administrator 302 generates group profile 304 using administrator device 306. Administrator 302 uploads group profile 304 to application server 308. In these examples, application server 308 is hardware and/or software for managing profiles and scheduling meetings. For example, application server 308 is an example of one embodiment of meeting system 202 in FIG. 2. For example, administrator device 306 may have used application 314 to generate group profile 304. Administrator 302 may download application 314 to administrator device 306. In another example, administrator 302 may enter information for group profile 304 into a browser for a web application configured to generate group profile 304.

In this illustrative embodiment, first user 310 and second user 312 join group profile 304. For example, first user 310 may view group profile 304 using user device 316. In these examples, administrator device 306 and user device 316 are examples of implementations of device 216 in FIG. 2. First user 310 can send information about user device 316 and personal profile settings for meeting notifications and subscriptions. For example, first user 310 may increase a threshold number of users attending a meeting before a notification will be sent to user device 316. In other examples, first user 310 may define a certain friend to be available at the meeting or request to be excluded from notifications on certain days and times.

In some embodiments, first user 310 downloads application 314 to user device 316. For example, without limitation, application 314 may allow first user 310 to view and modify personal and group profile settings, subscribe and unsubscribe to certain meeting topics, allow application server 308 to monitor location of user device 316, invite friends to join group profile 304, and receive meeting notifications at user device 316. Application 314 can then upload any changes to personal or group profile settings to application server 308.

In this illustrative embodiment, application server 308 monitors location of administrator 302, first user 310, and second user 312 relative to meeting location 318. Meeting location 318 is surrounded by meeting location threshold area 320. In this example, meeting location threshold area 320 is a circle with radius of threshold distance 322. If a threshold number of members of group profile 304 enter meeting location threshold area 320, application server 308 will send a notification of the meeting. The notification includes meeting location 318. The notification is sent to the members in meeting location threshold area 320.

In these illustrative examples, threshold distance 322 may be selected by administrator 302. For example, threshold distance 322 may be selected such that persons within meeting location threshold area 320 can arrive at meeting location 318 within a desired amount of time. In other examples, first user 310 may customize threshold distance 322 for first user 310. For example, first user 310 may not want to miss out on meetings and may be willing to hurry or be late to meetings. In another example, first user 310 may not have a mode of transportation or may only desire to attend meetings that are close to first user 310.

The illustration of meeting arrangement environment 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, meeting location threshold area 320 may be shapes other than a circle. For example, meeting location threshold area 320 may be based on estimated travel time to meeting location 318. Meeting location threshold area 320 may also take into account conditions of the area surrounding meeting location 318, such as, for example, without limitation, roads, public transportation, rivers, geographical boundaries, traffic conditions, and/or any other condition that may affect travel time to meeting location 318.

In other illustrative embodiments, user devices in meeting arrangement environment 300 may schedule meetings without the use of application server 308. For example, user devices in meeting arrangement environment 300 may communicate location and meeting scheduling information with each other to determine when and where to meet. In yet other illustrative embodiments, application 314 may be, for example, without limitation, a web application, a plug-in, a program, and/or any other type of software.

With reference now to FIG. 4, an illustration of a group profile for a meeting system is depicted in accordance with an illustrative embodiment. In these illustrative examples, group profile 400 is an example of one implementation of group profile 204 in FIG. 2 and group profile 304 in FIG. 3

Group profile 400 includes list of members 402. In this example, list of members 402 includes the names of three members that have joined the group. Group profile 400 includes device identifiers 404. Device identifiers 404 are used to send notifications to devices of members of group profile 400. Device identifiers 404 may also be used to track locations of devices. For example, without limitation, as depicted, device identifiers may include an internet protocol address, phone number, electronic mail address, and/or any other identifier for sending notifications to a device. Group profile 400 further includes list of administrators 406. In this example, Sue is the only administrator of group profile 400.

In this illustrative example, group profile 400 also includes group topics 408, group locations 410, and range of times 412. As depicted, group topics 408 are specific to certain locations within group locations 410. In this example, a meeting with the topic of business may be scheduled at any location. Thus, for example, a meeting notification process, such as, for example, meeting notification process 238 in FIG. 2, may select a location for a meeting including the topic of business.

In this illustrative example, range of times 412 are also specific to group topics 408. For example, range of times 412 include days and/or periods of time when meetings for each of group topics 408 can occur. Range of times 412 may also be specific to group locations 410. For example, certain locations in group locations 410 may be unavailable to host a meeting on certain days or during certain periods of time.

Group profile 400 also includes member threshold 414, distance threshold 416, privacy status 418, and password 420. Member threshold 414 and distance threshold 416 are used to determine when enough members are available to attend a meeting so that the meeting can be scheduled. Privacy status 418 determines whether the group is private or public. Private groups require an invitation from a member of the group. While public groups may be joined by people that are interested in the group. Password 420 is a security measure to restrict access to information in group profile 400. For example, private groups may require entry of password 420 to join the group or view information in group profile 400.

Figure 5:
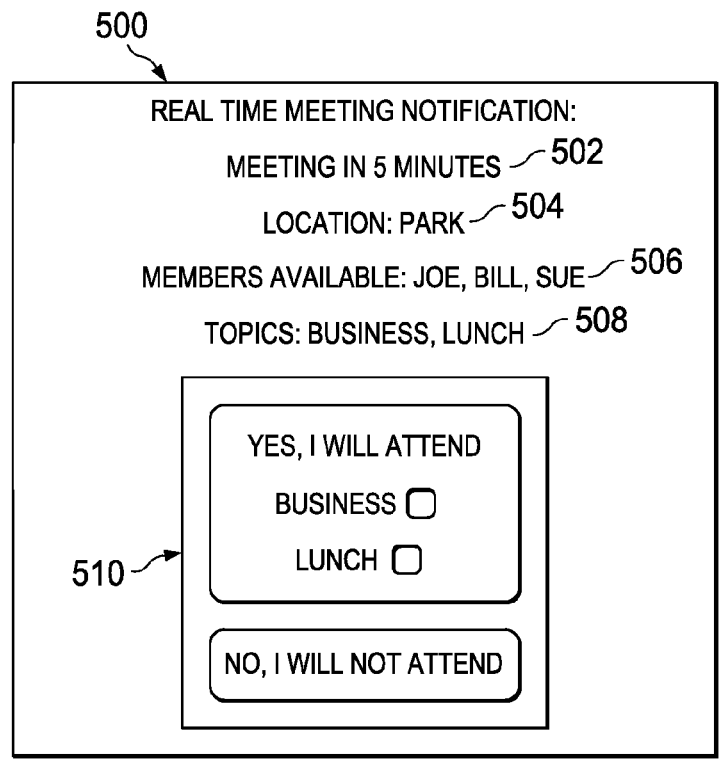
FIG. 5 is an illustration of a real time meeting notification in accordance with an illustrative embodiment.

With reference now to FIG. 5, an illustration of a real time meeting notification is depicted in accordance with an illustrative embodiment. In this illustrative example, real time meeting notification 500 is an example of one implementation of information from notification 240 that may be displayed to user 218 in FIG. 2. Real time meeting notification 500 may be displayed to members of a group profile, such as, for example, list of members 402 of group profile 400 in FIG. 4.

In this example, real time meeting notification 500 includes meeting start time 502, meeting location 504, members available 506, and meeting topics 508. Real time meeting notification 500 further includes interface 510. Interface 510 receives a response from a user of whether the user will attend the meeting and which topics the user will attend.

In this illustrative example, real time meeting notification 500 may be sent to a user device and displayed on a display for the user device. For example, without limitation, real time meeting notification 500 may be an electronic mail message, a text message, a push notification, a chat message, a calendar alert, and/or any other type of message to notify a user of a meeting.

The illustration group profile 400 in FIG. 4 and real time meeting notification 500 in FIG. 5 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, group profile 400 can include additional and/or different information. For example, some members in list of members 402 may not subscribe to all meeting topics in group topics 408. In other examples, group profile 400 may include different thresholds for member threshold 414 and distance threshold 416 that are specific to one or more members in list of members 402. In yet other examples, group profile 400 may include different ranges of times in range of times 412 that are specific to one or more members in list of members 402. For example, one member may only be able to meet for ranges of times that are smaller or larger than other members.

In other illustrative embodiments, real time meeting notification 500 may not include meeting start time 502. Rather real time meeting notification 500 may indicate that the meeting is already occurring at meeting location 504.

Figure 6:
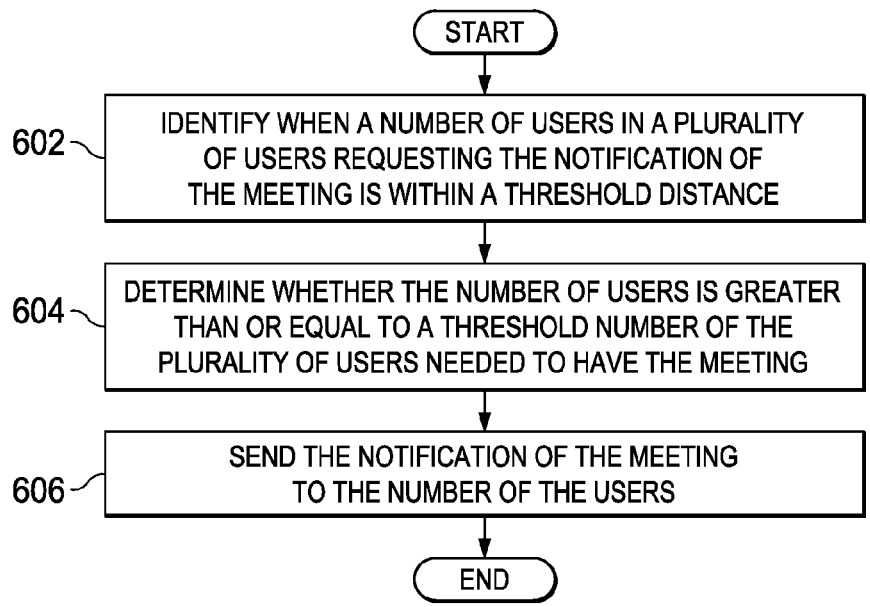
FIG. 6 is a flowchart of a process for sending a notification of a meeting in accordance with an illustrative embodiment.

With reference now to FIG. 6, an illustration of a flowchart of a process for sending a notification of a meeting is depicted in accordance with an illustrative embodiment. The process illustrated in FIG. 6 may be implemented by meeting notification process 238 in FIG. 2. The process also may be implemented in application server 308 in FIG. 3.

The process begins by identifying a when a number of users in a plurality of users requesting the notification of the meeting is within a threshold distance (step 602). In step 602, the plurality of users is users that have subscribed to meeting notifications. The number of users is users in the plurality of users that are within the threshold distance. The process may also identify the threshold distance. In one example, the threshold distance may be based on distances between two or more users. In another example, the threshold distance may also be based on a distance between a user and a meeting location. The process then determines whether the number of users is greater than or equal to a threshold number of the plurality of users needed to have the meeting (step 604). In step 604, the threshold number is a minimum number of users needed to have the meeting. Thereafter, the process sends the notification of the meeting to the number of the users (step 606), with the process terminating thereafter.

Figure 7:
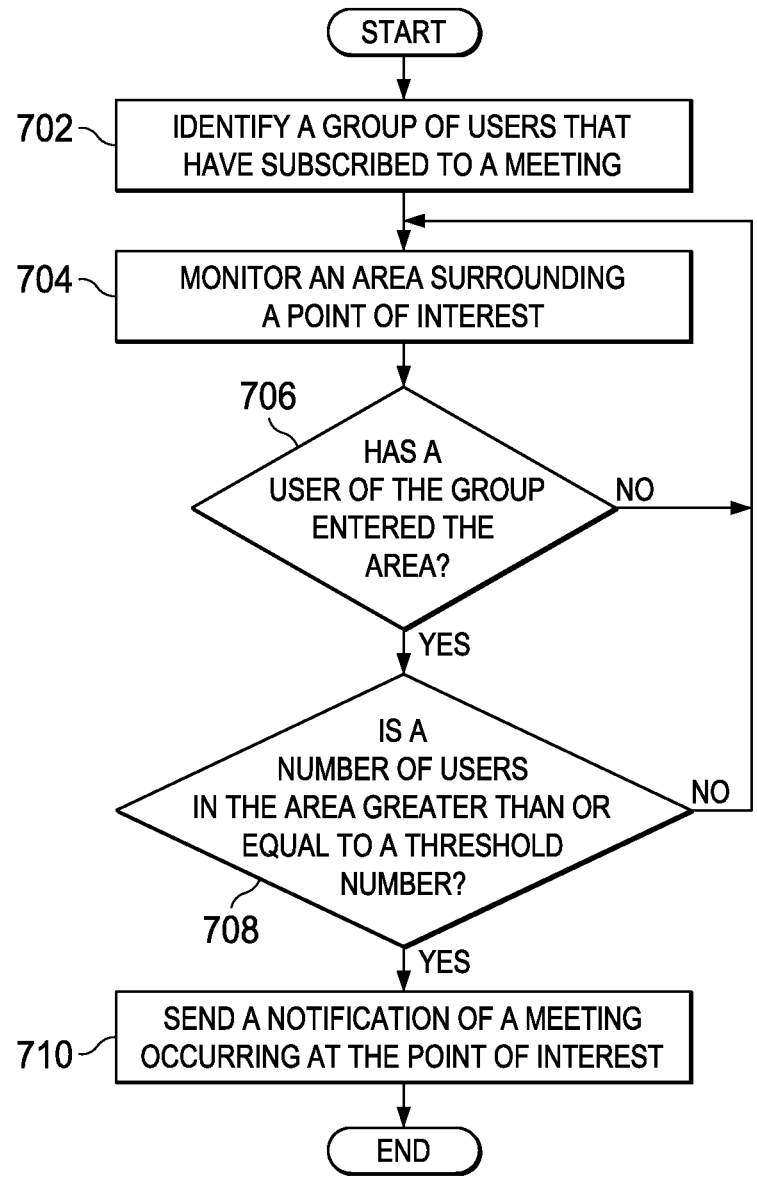
FIG. 7 is a flowchart of a process for sending a notification of a meeting occurring at a point of interest in accordance with an illustrative embodiment.

With reference now to FIG. 7, an illustration of a flowchart of a process for sending a notification of a meeting occurring at a point of interest is depicted in accordance with an illustrative embodiment. The process illustrated in FIG. 7 may be implemented by meeting notification process 238 in FIG. 2. The process also may be implemented in application server 308 in FIG. 3.

The process begins by identifying a group of users that have subscribed to a meeting (step 702). The process then monitors an area surrounding a point of interest (step 704). Thereafter, the process determines whether a user of the group has entered the area (step 706). If the process determines that a user of the group has not entered the area, the process returns to step 704 and monitors the area surrounding the point of interest.

If, however, the process determines that a user of a group has entered the area, the process determines whether a number of users in the area is greater than or equal to a threshold number (step 708). If the process determines that the number of users in the area is less than the threshold number, the process returns to step 704 and monitors the area surrounding the point of interest. If, however, the process determines that number of users in the area is greater than or equal to a threshold number, the process sends a notification of a meeting occurring at the point of interest (step 710), with the process terminating thereafter.

Figure 8:
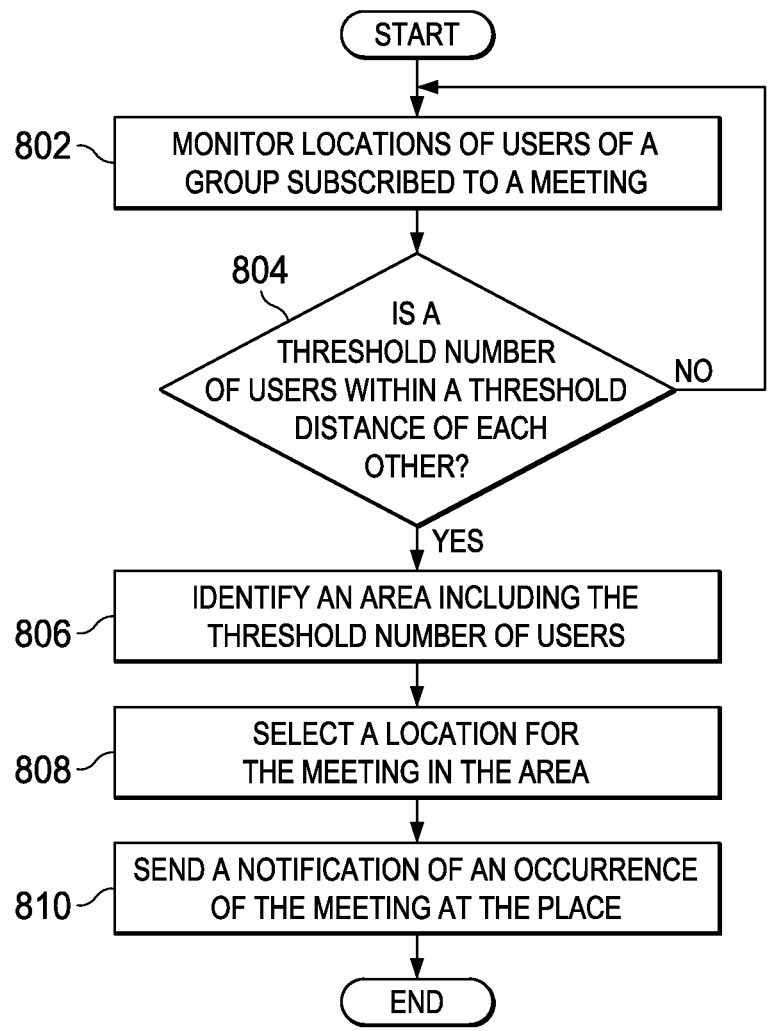
FIG. 8 is a flowchart of a process for identifying a location for a meeting in accordance with an illustrative embodiment.

With reference now to FIG. 8, an illustration of a flowchart of a process for a location for a meeting is depicted in accordance with an illustrative embodiment. The process illustrated in FIG. 8 may be implemented by meeting notification process 238 in FIG. 2. The process also may be implemented in application server 308 in FIG. 3.

The process begins by monitoring locations of users of a group subscribed to a meeting (step 802). The process then determines whether a threshold number of the users is within a threshold distance of each other (step 804). In step 804, the process may identify a location of the threshold number of users that are closest to each other. The process may then identify a distance between the users in the threshold number that are the farthest apart. If that distance is less than or equal to the threshold distance, the process may determine that each of the threshold number of users is within the threshold distance of each other. If the process determines that the threshold number of users is not within the threshold distance of each other, the process returns to step 802 and monitors the locations of users of the group subscribed to a meeting.

If, however, the process determines that the threshold number of users is within the threshold distance of each other, the process identifies an area including the threshold number of users (step 806). Thereafter, the process selects a location for the meeting in the area (step 808). In step 808, the process may select the location based on a number of different criteria including, for example, without limitation, topics for the meeting, availability of locations within the area to host the meeting, convenience for each of the users to travel to them meeting location, and/or any other criteria to consider in selecting locations for a meeting. The process then sends a notification of an occurrence of the meeting at the place (step 810), with the process terminating thereafter.

Figure 9:
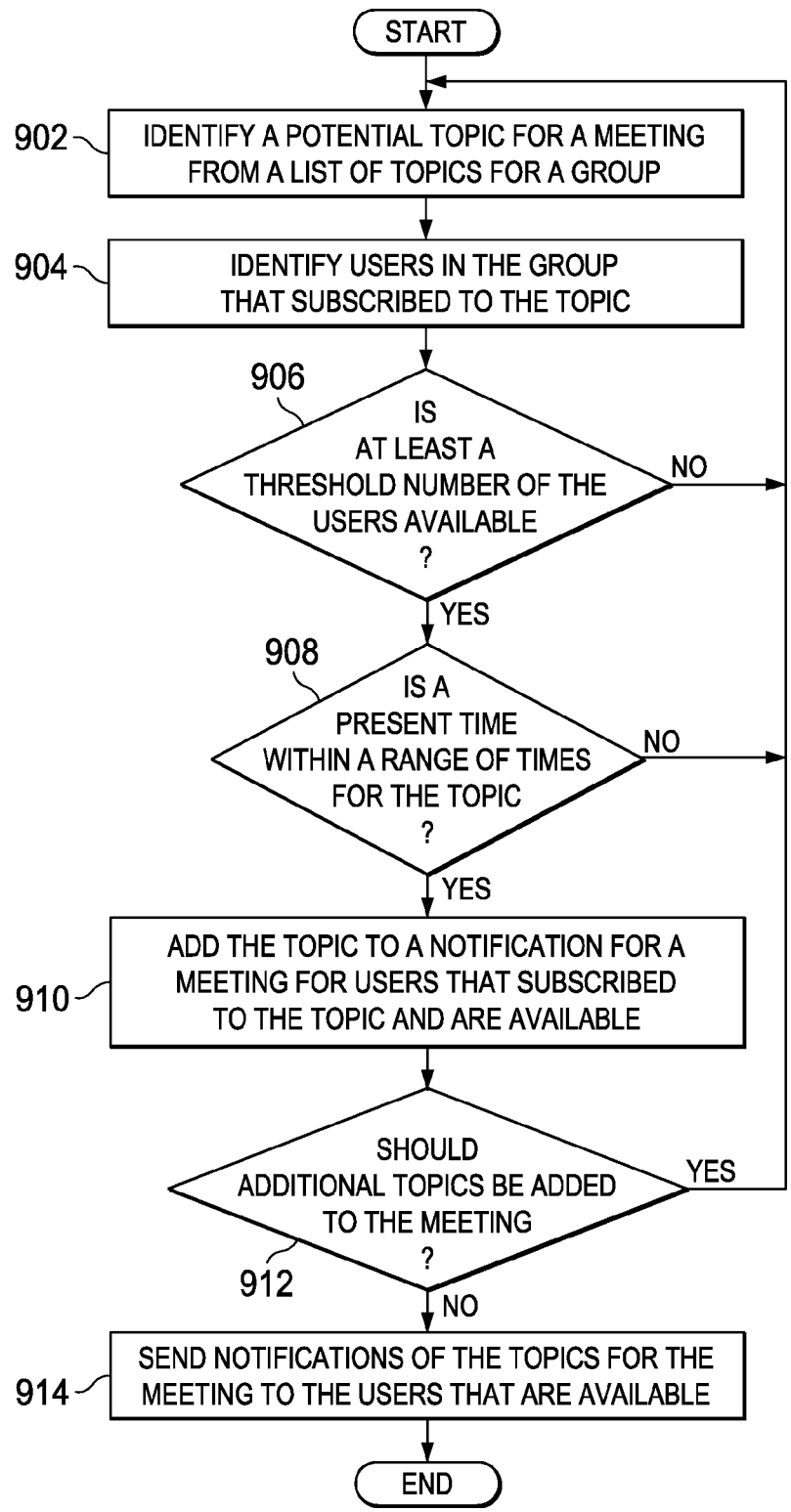
FIG. 9 is a flowchart of a process for identifying a list of topics for a meeting in accordance with an illustrative embodiment.

With reference now to FIG. 9, an illustration of a flowchart of a process for identifying a list of topics for a meeting is depicted in accordance with an illustrative embodiment. The process illustrated in FIG. 9 may be implemented by meeting notification process 238 in FIG. 2. The process also may be implemented in application server 308 in FIG. 3.

The process begins by identifying a potential topic for a meeting from a list of topics for a group (step 902). The process then identifies users in the group that subscribed to the topic (step 904). Thereafter, the process determines whether at least a threshold number of the users is available (step 906). In step 906, the users may be considered to be available based on proximity to a meeting location. The users may also be considered to be available based on proximity to other users. If the process determines that the threshold number of the users is not available, the process returns to step 902 and identifies another potential topic for the meeting from the list of topics for the group.

If the process determines that the threshold number of the users is available, the process determines whether a present time is within a range of times for the topic (step 908). If the process determines that the present time is not within the range of times for the topic, the process returns to step 902 and identifies another potential topic for the meeting from the list of topics for the group.

If, however, the process determines that the present time is within the range of times for the topic, the process adds the topic to a notification for a meeting for users that subscribed to the topic and are available (step 910). The process then determines whether additional topics should be added to the meeting (step 912). In step 912, the process determines whether additional potential topics have not been tested to see if the meeting could include the additional potential topic. The process looks for additional potential topics to populate the list of topics for the meeting.

If the process determines that additional topics should be added to the meeting, the process returns to step 902 and identifies another potential topic for the meeting from the list of topics for the group. If the process determines that additional topics should not be added to the meeting, the process sends notifications of the topics for the meeting to the users that are available (step 914), with the process terminating thereafter. In step 914.

The flowchart and block diagrams in the Figures illustrate the architecture, functionality, and operation of possible implementations of systems, methods and computer program products according to various illustrative embodiments. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Figure 10:
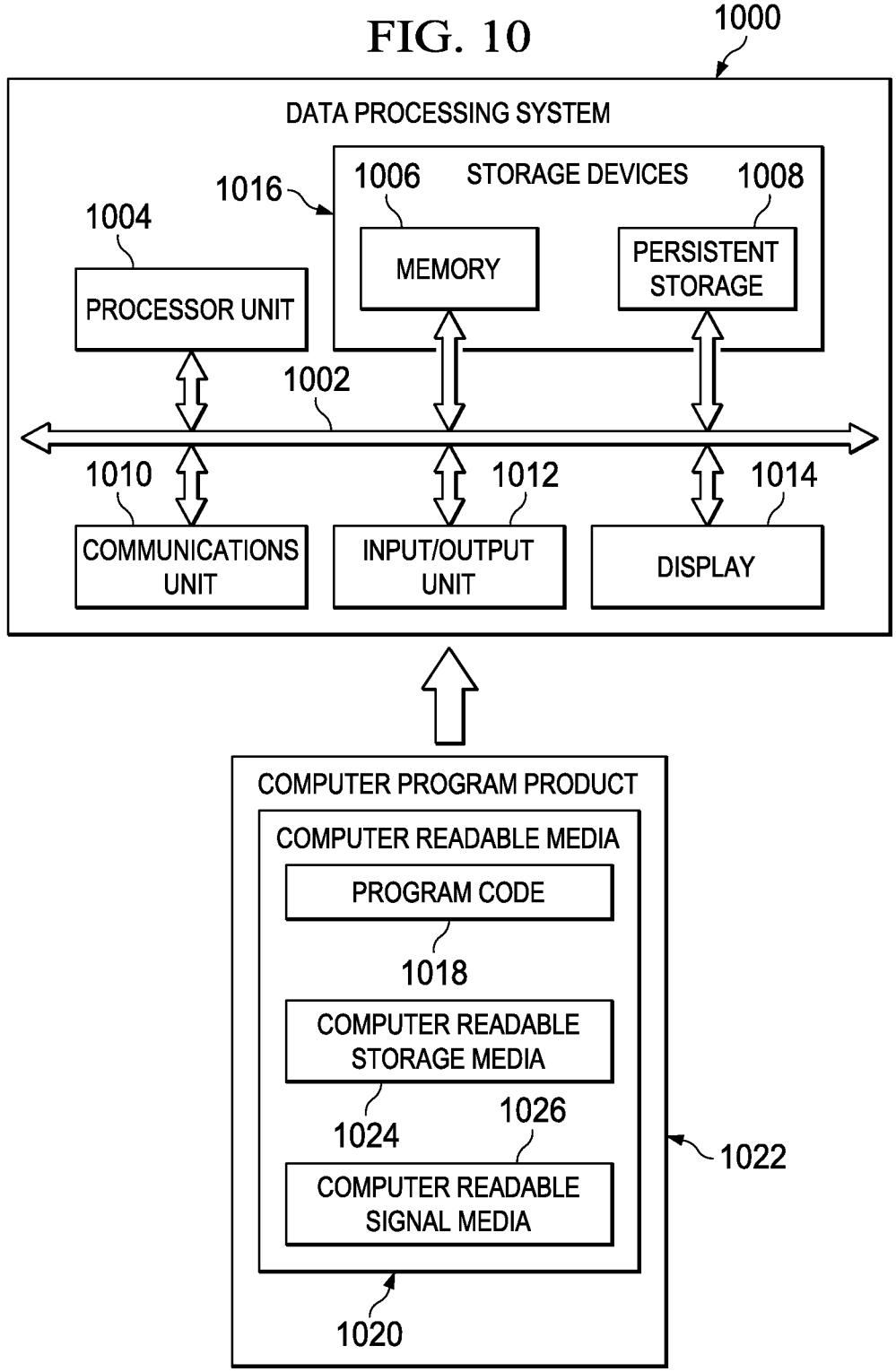
FIG. 10 is an illustration of a data processing system in accordance with an illustrative embodiment.

Turning now to FIG. 10, an illustration of a block diagram of a data processing system is depicted in accordance with an illustrative embodiment. In this illustrative example, data processing system 1000 includes communications fabric 1002, which provides communications between processor unit 1004, memory 1006, persistent storage 1008, communications unit 1010, input/output (I/O) unit 1012, and display 1014. In these illustrative examples, data processing system 1000 is an example of one implementation of meeting system 202 and/or device 216 in FIG. 2. Data processing system 1000 is also one example of application server 308 in FIG. 3.

Processor unit 1004 serves to process instructions for software that may be loaded into memory 1006. Processor unit 1004 may be a number of processors, a multi-processor core, or some other type of processor, depending on the particular implementation. Further, processor unit 1004 may be implemented using a number of heterogeneous processor systems in which a main processor is present with secondary processors on a single chip. As another illustrative example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output unit 1012 allows for input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications fabric 1002. In these illustrative examples, the instructions are in a functional form on persistent storage 1008. These instructions may be loaded into memory 1006 for processing by processor unit 1004. The processes of the different embodiments may be performed by processor unit 1004 using computer implemented instructions, which may be located in a memory, such as memory 1006.

These instructions are referred to as program code, computer usable program code, or computer readable program code that may be read and processed by a processor in processor unit 1004. The program code in the different embodiments may be embodied on different physical or tangible computer readable media, such as memory 1006 or persistent storage 1008.

Program code 1018 is located in a functional form on computer readable media 1020 that is selectively removable and may be loaded onto or transferred to data processing system 1000 for processing by processor unit 1004. Program code 1018 and computer readable media 1020 form computer program product 1022 in these examples. In one example, computer readable media 1020 may be computer readable storage media 1024 or computer readable signal media 1026. Computer readable storage media 1024 may include, for example, an optical or magnetic disk that is inserted or placed into a drive or other device that is part of persistent storage 1008 for transfer onto a storage device, such as a hard drive, that is part of persistent storage 1008. Computer readable storage media 1024 also may take the form of a persistent storage, such as a hard drive, a thumb drive, or a flash memory, that is connected to data processing system 1000. In some instances, computer readable storage media 1024 may not be removable from data processing system 1000. In these illustrative examples, computer readable storage media 1024 is a non-transitory computer readable storage medium.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1018 may be downloaded over a network to persistent storage 1008 from another device or data processing system through computer readable signal media 1026 for use within data processing system 1000. For instance, program code stored in a computer readable storage medium in a server data processing system may be downloaded over a network from the server to data processing system 1000. The data processing system providing program code 1018 may be a server computer, a client computer, or some other device capable of storing and transmitting program code 1018.

Storage devices 1016 are examples of implementations of storage devices that could store group profile 204 and/or set of user profiles 208 in FIG. 2. Further, program code 1018 may include program code for scheduling meetings and sending meeting notifications, such as, for example, meeting notification process 238 in FIG. 2.

The different components illustrated for data processing system 1000 are not meant to provide architectural limitations to the manner in which different embodiments may be implemented. The different illustrative embodiments may be implemented in a data processing system including components in addition to, or in place of, those illustrated for data processing system 1000. Other components shown in FIG. 10 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1018 may be omitted, because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

As another example, a storage device in data processing system 1000 is any hardware apparatus that may store data. Memory 1006, persistent storage 1008, and computer readable media 1020 are examples of storage devices in a tangible form.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1006, or a cache, such as found in an interface and memory controller hub that may be present in communications fabric 1002.

As another example, a storage device in data processing system 1000 is any hardware apparatus that may store data. Memory 1006, persistent storage 1008, and computer readable media 1020 are examples of storage devices in a tangible form.

The different illustrative embodiments recognize and take into account that it may be desirable to schedule a meeting when meeting invitees can attend the meeting. The different illustrative embodiments schedule meetings based on locations of users. Group and user profiles are established to determine meeting preferences in advance. The different illustrative embodiments determine the availability of the users in the group based on their location and profile settings.

Meetings can be scheduled and notifications of meetings can be sent to number of users without user input during scheduling. Further, a location for meeting can be selected without user input. For example, the location for meeting may be selected dynamically based on user location. The different illustrative embodiments schedule meetings in real time during and, even in some cases, after the attendees of the meeting are traveling to the meeting location. The different illustrative embodiments can schedule meetings at times and locations where users are available to attend the meetings.

Thus, the illustrative embodiments provide a computer implemented method, data processing system, and computer program product for sending a notification of a meeting. An identification is made when a number of users in a plurality of users requesting the notification of the meeting is within a threshold distance. Whether the number of users is greater than or equal to a threshold number of the plurality of users needed to have the meeting is determined in response to the identification that the number of users in the plurality of users is within the threshold distance. The notification of the meeting is sent to the number of the users in response to determining that the number of users is greater than or equal to the threshold number.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for sending a notification of a meeting, the method comprising:
    identifying, by a processor using information stored in a group profile, when a number of users, in a plurality of users requesting the notification of the meeting, is within a threshold distance;
    providing, by the processor, using topics selected from one of a set of user profiles and the group profile, a list of topics for the meeting to the number of users;
    receiving, by the processor, information regarding which topics from the list of topics which users in the number of users will attend;
    identifying, by the processor, an updated number of users that will attend a particular topic for the meeting from the information;
    determining, by the processor using information stored in the group profile, whether the updated number of users is less than the threshold number for the particular topic;
    responsive to determining, by the processor, that the updated number of users is less than the threshold number for the particular topic, sending, by the communication unit responsive to the processor using device identifiers maintained in the group profile, a cancellation notification for the particular topic for the meeting to the updated number of users;
    responsive to identifying, by the processor using information stored in the group profile, that the updated number of users in the plurality of users is within the threshold distance, determining, by the processor using information stored in the group profile, whether the updated number of users is greater than or equal to a threshold number of the plurality of users needed to have the meeting; and
    responsive to determining that the updated number of users is greater than or equal to the threshold number, sending, by a communication unit responsive to the processor using device identifiers maintained in the group profile, the notification of the meeting to the updated number of the users.

2. The method of claim 1, wherein identifying, by the processor using information stored in the group profile, when the number of users in the plurality of users requesting the notification of the meeting is within the threshold distance comprises:
    identifying, by the processor, when the number of users are within the threshold distance of a point of interest selected from group locations in the group profile.

3. The method of claim 2, wherein sending, by a communication unit responsive to the processor using device identifiers maintained in the group profile, the notification of the meeting to the updated number of the users comprises:
including the point of interest in the notification as a location for the meeting.

4. The method of claim 1, wherein identifying, by a processor using information stored in the group profile, when the number of users in the plurality of users requesting the notification of the meeting is within the threshold distance comprises:
identifying, by the processor using information stored in the group profile, when a first user in the number of users is within the threshold distance of a second user in the number of users.

5. The method of claim 4 further comprising:
identifying, by the processor using information stored in the group profile, a location for the meeting in an area between the first user and the second user; and
including, by the processor, the location for the meeting in the notification of the meeting.

6. The method of claim 1 further comprising:
responsive to determining, by the processor, that the updated number of users is greater than or equal to the threshold number, identifying a range of times that the meeting is permitted to occur using information stored in the group profile; and
determining, by the processor, whether a present time is within the range of times that the meeting is permitted to occur; and
wherein sending, by the communication unit responsive to the processor using device identifiers maintained in the group profile, the notification of the meeting to the updated number of the users comprises:
sending, by the communication unit responsive to the processor, the notification of the meeting to the number of the updated users in response to determining that the present time is within the range of times using device identifiers maintained in the group profile.

7. The method of claim 1 further comprising:
monitoring, by the processor using device identifiers maintained in the group profile, a location of a device of a user in the plurality of users to identify when the user is within the threshold distance, wherein the notification is sent, by the communication unit responsive to the processor using device identifiers maintained in the group profile, to the device of the user.

8. A computer program product for sending a notification of a meeting, the computer program product comprising:
a set of computer readable storage devices;
program code, stored on at least one of the set of computer readable storage devices, configured to identify, using information stored in a group profile, when a number of users in a plurality of users requesting the notification of the meeting is within a threshold distance;
program code, stored on at least one of the set of computer readable storage devices, configured to determine using information stored in a group profile whether the number of users is greater than or equal to a threshold number of the plurality of users needed to have the meeting in response to identifying that the number of users in the plurality of users is within the threshold distance;
program code, stored on at least one of the set of computer readable storage devices, configured to provide using topics selected from one of a set of user profiles and the group profile, a list of topics for the meeting to the number of users;
program code, stored on at least one of the set of computer readable storage devices, configured to receive information regarding which topics from the list of topics which users in the number of users will attend;
program code, stored on at least one of the set of computer readable storage devices, configured to identify an updated number of users that will attend a particular topic for the meeting from the information;
program code, stored on at least one of the set of computer readable storage devices, configured to determine using information stored in the group profile, whether the updated number of users is less than the threshold number for the particular topic;
program code, stored on at least one of the set of computer readable storage devices, configured responsive to determining the updated number of users is less than the threshold number for the particular topic, to send, by the communication unit responsive to the processor using device identifiers maintained in the group profile, a cancellation notification for the particular topic for the meeting to the updated number of users;
program code, stored on at least one of the set of computer readable storage devices, configured responsive to identifying using information stored in the group profile, that the updated number of users in the plurality of users is within the threshold distance, to determine using information stored in the group profile, whether the updated number of users is greater than or equal to a threshold number of the plurality of users needed to have the meeting; and
program code, stored on at least one of the set of computer readable storage devices, configured responsive to determining the updated number of users is greater than or equal to the threshold number, to send, by a communication unit responsive to the processor using device identifiers maintained in the group profile, the notification of the meeting to the updated number of the users.

9. The computer program product of claim 8, wherein the program code configured to identify, using information stored in a group profile, when the number of users in the plurality of users requesting the notification of the meeting is within the threshold distance comprises:
program code, stored on at least one of the set of computer readable storage devices, configured to identify when the number of users are within the threshold distance of a point of interest selected from group locations in the group profile.

10. The computer program product of claim 9, wherein the program code configured to send, using device identifiers maintained in the group profile, the notification of the meeting to the updated number of the users comprises:
program code, stored on at least one of the set of computer readable storage devices, configured to include the point of interest in the notification as a location for the meeting.

11. The computer program product of claim 8, wherein the program code configured to identify, using information in the group profile, when the number of users in the plurality of users requesting the notification of the meeting is within the threshold distance comprises:
program code, stored on at least one of the set of computer readable storage devices, configured to identify, using information in the group profile, when a first user in the number of users is within the threshold distance of a second user in the number of users.

12. The computer program product of claim 11 further comprising:
program code, stored on at least one of the set of computer readable storage devices, configured to identify, using information in the group profile, a location for the meeting in an area between the first user and the second user; and program code, stored on at least one of the set of computer readable storage devices, configured to include the location for the meeting in the notification of the meeting.

13. The computer program product of claim 8 further comprising:

program code, stored on at least one of the set of computer readable storage devices, configured to identify, using information in the group profile, a range of times that the meeting is permitted to occur in response to determining that the updated number of users is greater than or equal to the threshold number; and program code, stored on at least one of the set of computer readable storage devices, configured to determine whether a present time is within the range of times that the meeting is permitted to occur; and wherein the program code configured to send using device identifiers maintained in the group profile the notification of the meeting to the updated number of the users comprises:

program code, stored on at least one of the set of computer readable storage devices, configured to send the notification of the meeting to the updated number of the users in response to determining that the present time is within the range of times using device identifiers maintained in the group profile.

14. A data processing system for sending a notification of a meeting, the data processing system comprising:

a bus system;

a storage device connected to the bus system, wherein the storage device includes program code; and a processor unit connected to the bus system, wherein the processor unit is configured to identify, using information stored in a group profile, when a number of users in a plurality of users requesting the notification of the meeting is within a threshold distance, determine, using information stored in a group profile, whether the number of users is greater than or equal to a threshold number of the plurality of users needed to have the meeting in response to identifying that the number of users in the plurality of users is within the threshold distance, provide using topics selected from one of a set of user profiles and the group profile, a list of topics for the meeting to the number of users; receive information regarding which topics from the list of topics which users in the number of users will attend; identify an updated number of users that will attend a particular topic for the meeting from the information; determine using information stored in the group profile, whether the updated number of users is less than the threshold number for the particular topic; responsive to determining the updated number of users is less than the threshold number for the particular topic, send by the communication unit responsive to the processor using device identifiers maintained in the group profile, a cancellation notification for the particular topic for the meeting to the updated number of users; responsive to identifying, by the processor using information stored in the group profile, that the updated number of users in the plurality of users is within the threshold distance, determining, by the processor using information stored in the group profile, whether the updated number of users is greater than or equal to a threshold number of the plurality of users needed to have the meeting; and responsive to determining that the updated number of users is greater than or equal to the threshold number, sending, by a communication unit responsive to the processor using device identifiers maintained in the group profile, the notification of the meeting to the updated number of the users.

15. The data processing system of claim 14, wherein in executing the program code to identify, using information stored in a group profile, when the number of users in the plurality of users requesting the notification of the meeting is within the threshold distance, the processor unit is further configured to identify when the number of users are within the threshold distance of a point of interest selected from group locations in the group profile.

16. The data processing system of claim 15, wherein in executing the program code to send, using device identifiers maintained in the group profile, the notification of the meeting to the updated number of the users, the processor unit is further configured to include the point of interest in the notification as a location for the meeting.

17. The data processing system of claim 14, wherein in executing the program code to identify, using information stored in a group profile, when the number of users in the plurality of users requesting the notification of the meeting is within the threshold distance, the processor unit is further configured to identify, using information stored in a group profile, when a first user in the number of users is within the threshold distance of a second user in the number of users.

18. The data processing system of claim 17, wherein the processor unit is further configured to identify, using information stored in a group profile, a location for the meeting in an area between the first user and the second user and include the location for the meeting in the notification of the meeting.

19. The data processing system of claim 14, wherein the processor unit is further configured to identify, using information in the group profile, a range of times that the meeting is permitted to occur in response to determining that the updated number of users is greater than or equal to the threshold number and determine whether a present time is within the range of times that the meeting is permitted to occur; and wherein in executing the program code to send, using device identifiers maintained in the group profile, the notification of the meeting to the updated number of the users, the processor unit is further configured to send, using device identifiers maintained in the group profile, the notification of the meeting to the updated number of the users in response to determining that the present time is within the range of times.

* * * * *